No. 748,739. PATENTED JAN. 5, 1904.
W. HUFFELMANN.
PROCESS OF MAKING BRIQUETS.
APPLICATION FILED JUNE 16, 1903.
NO MODEL. 2 SHEETS—SHEET 1.

Witnesses: Inventor:

No. 748,739. PATENTED JAN. 5, 1904.
W. HUFFELMANN.
PROCESS OF MAKING BRIQUETS.
APPLICATION FILED JUNE 16, 1903.
NO MODEL. 2 SHEETS—SHEET 2.

Witnesses: Inventor:

No. 748,739. Patented January 5, 1904.

UNITED STATES PATENT OFFICE.

WILHELM HUFFELMANN, OF DUISBURG, GERMANY.

PROCESS OF MAKING BRIQUETS.

SPECIFICATION forming part of Letters Patent No. 748,739, dated January 5, 1904.

Application filed June 16, 1903. Serial No. 161,637. (No specimens.)

*To all whom it may concern:*

Be it known that I, WILHELM HUFFELMANN, a citizen of the German Empire, residing at Duisburg, in the Province of Rhenish Prussia and Kingdom of Prussia, Germany, have invented certain new and useful Improvements in Processes of Making Briquets from Granulated Ores, Sand Ores, and Similar Fine Ores for Use in Blast-Furnaces, of which the following is a specification, reference being had therein to the accompanying drawings.

This invention relates to an improved process in making briquets of granulated ores, sand ores, and the like fine ores capable and fit for being used direct in the blast-furnace for the reduction of the ores or also for being stacked without being influenced by weather and the atmosphere.

The principal idea of my invention consists in this that the ore to be formed in briquets, together with the binding material added thereto, is first freed from all humidity and thoroughly dried, then mixed with tar in hot and liquid state, whereupon the mixed material is molded in briquets in a suitable press, and finally the briquets thus formed are heated to a bright red heat and then allowed to cool down, when they are ready for immediate use or for being stacked for eventual use. They can resist any pressure in the blast-furnace, and they do not deteriorate under atmospheric influences.

I shall explain my process by the aid of the accompanying drawings, which show in—

Figure 1:
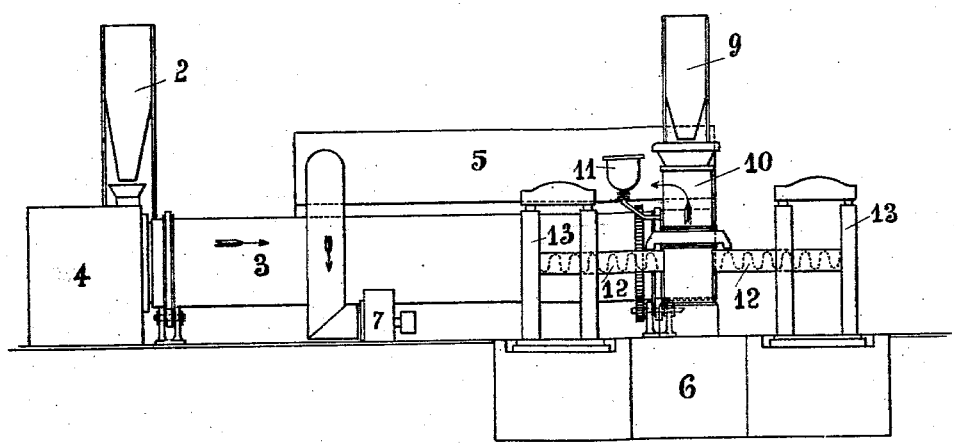
Figure 2:
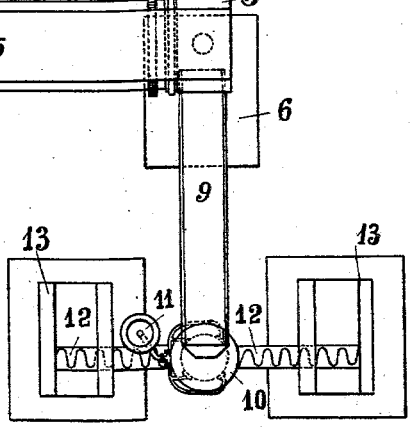
Figure 3:
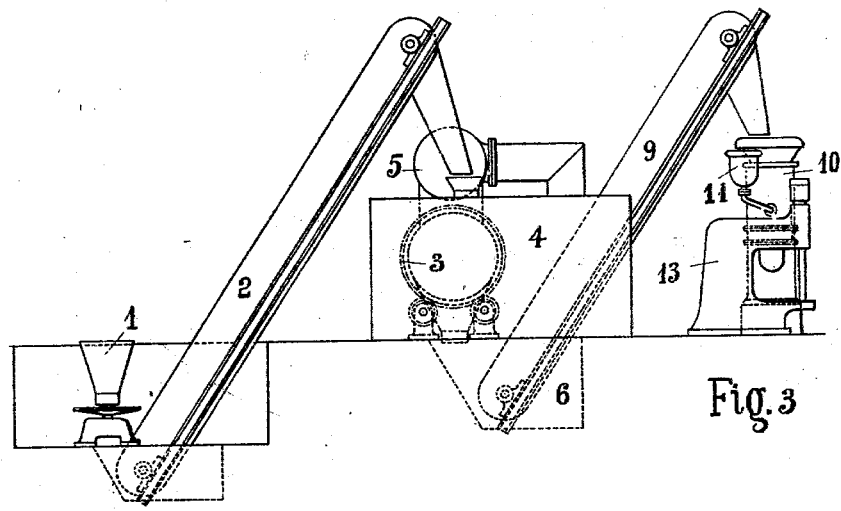
Figure 4:
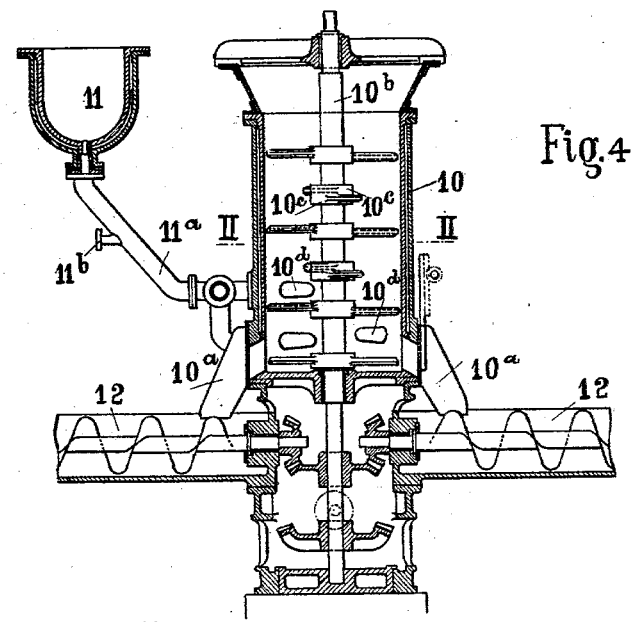
Figure 5:
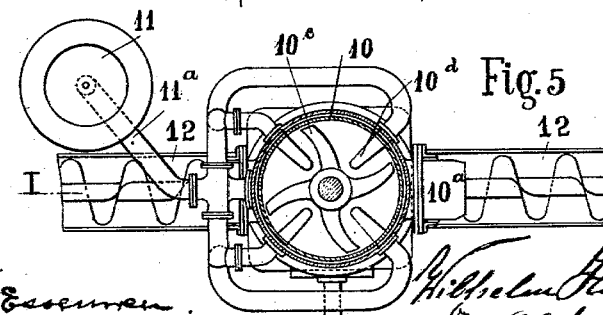

Figure 1 a side elevation, and in Fig. 2 a plan, and in Fig. 3 a front elevation, of a complete arrangement, while Fig. 4 shows the tar-mixing apparatus with parts of the conveyers in a vertical central section along line I I of Fig. 5, which is a section along line II II of Fig. 4.

In making briquets of fine ores according to my new process I proceed as follows: I use, as usual, granulated ores or sand ores, to which coke or charcoal reduced to about the same size of corn as the ore is added in due proportion to the quality of the ore by means of the two distributers 1 and $1^a$ of suitable construction. Where found necessary, fluxes, purifying and enriching materials may be added. These materials are then raised up by the dredger 2 and discharged into the drying and mixing drum 3, which by preference is made according to what is known as "Hecking's" system—that is to say, a slowly-revolving drum in which the material to be treated is continually raised and slowly advanced from the entrance end to the discharge end $3^a$, where it falls down into a pit 6. In the drum it is mixed intimately by the continuous rolling and tumbling over while the heating-gases developed in a furnace 4 pass along through the drum in the direction of the arrow, thereby drying the material and rising at the other end up to a drum 5, where dust and small material is deposited and whence the gases and vapor are drawn off by a fan 7 and blown into a chimney 8. The dried and mixed material is raised from the pit 6 by a dredger 9 into the tar-mixing mill 10. (Shown in detail in Figs. 4 and 5.) This mill resembles in its construction and working a vertical clay-mill. It consists of a vertical vessel open at the top and closed at the bottom, but having outlets $10^a$ at the side near the bottom, a central shaft $10^b$, provided with wings or arms $10^c$, mixing the material still more. This vessel is steam-jacketed and heated by steam. Into it the liquefied tar is discharged by the twyers $10^d$, which are connected to the pipe $11^a$, leading from the tar-kettle 11, in which the tar is heated so as to be quite fluid. Superheated steam is blown into the pipe $11^a$ by a steam-pipe $11^b$, and this drives the liquefied tar in a fine spray through the twyers $10^d$ into the mixing vessel 10, where the tar envelops each particle of ore and coke or charcoal in a fine layer, and in this state the material is discharged at $10^a$ into a conveyer 12, which conducts the material onto the press 13. In the drawings two conveyers and two presses are shown. These may be of any suitable design. They need, therefore, no special description. I may, however, mention that I prefer presses of the system according to the United States Patent No. 650,139, which when provided with proper multiple molds have been found most suitable for this special purpose. The briquets coming from the press when cooled down are ready for immediate use in the blast-furnace. In some cases where it is desired to stack them up for eventual use I prefer to expose them to a bright red heat; but this is not absolutely necessary.

I am aware that it has been tried in other manners to solve the problem of producing briquets of fine ores fit for use in the blast-furnace, and I therefore do not claim such a process in general as my invention; but What I do claim is—

1. The process of making briquets of fine ores, granulated ores or sand ores for use in the blast-furnace, consisting in mixing said ores with coke or charcoal reduced to the same size of corn as the ores; completely drying these materials in a drying apparatus where they are more intimately mixed and freed from humidity; raising the dried and mixed materials in hot state into a mixing-mill where liquefied tar is added thereto by blowing the tar by means of a steam-jet and twyers into the mixing-mill thereby finely surrounding each ore and coke particle with tar; after which the complete mixture of ore, carbon and tar is passed through a press in which it is molded into briquets of suitable size under heavy pressure; substantially as described and for the purpose set forth.

2. The process of making briquets of fine ores, granulated ores or sand ores for use in the blast-furnace, consisting in mixing sand ores with coke or charcoal reduced to the same size of corn as the ores; completely drying these materials in a drying apparatus where they are more intimately mixed and freed from humidity; raising the dried and mixed materials in hot state into a mixing-mill where liquefied tar is added thereto by blowing the tar by means of a steam-jet and twyers into the mixing-mill, thereby finely surrounding each ore and coke particle with tar; after which the complete mixture of ore, carbon and tar is passed through a press in which it is molded into briquets of suitable size under heavy pressure, then heating the molded briquets to a bright red heat and cooling them, substantially as described and for the purpose set forth.

In testimony whereof I have affixed my signature in presence of two witnesses.

WILHELM HUFFELMANN.

Witnesses:
PETER LIEBER,
WILLIAM ESSENWEIN.